United States Patent
Yokoyama

(10) Patent No.: US 9,825,469 B2
(45) Date of Patent: Nov. 21, 2017

(54) EQUIPMENT POWER MANAGEMENT SYSTEM

(71) Applicant: Jun Yokoyama, Tokyo (JP)

(72) Inventor: Jun Yokoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/991,345

(22) Filed: Jan. 8, 2016

(65) Prior Publication Data

US 2016/0118804 A1 Apr. 28, 2016

Related U.S. Application Data

(62) Division of application No. 13/253,752, filed on Oct. 5, 2011, now Pat. No. 9,270,114.

(30) Foreign Application Priority Data

Oct. 25, 2010 (JP) ................. 2010-238094

(51) Int. Cl.
*H02J 3/14* (2006.01)
*H02J 4/00* (2006.01)
*G06F 1/32* (2006.01)

(52) U.S. Cl.
CPC ............ *H02J 4/00* (2013.01); *G06F 1/32* (2013.01); *H02J 3/14* (2013.01); *Y02B 70/3225* (2013.01); *Y02B 70/3266* (2013.01); *Y04S 20/222* (2013.01); *Y04S 20/242* (2013.01); *Y10T 307/406* (2015.04); *Y10T 307/832* (2015.04)

(58) Field of Classification Search
CPC ........................................... H02J 4/00
See application file for complete search history.

(56) References Cited

U.S. PATENT DOCUMENTS

| | | | |
|---|---|---|---|
| 8,516,284 B2 | 8/2013 | Chan | G06F 9/5094 713/320 |
| 2008/0252141 A1* | 10/2008 | Horst | H02J 3/14 307/35 |

(Continued)

FOREIGN PATENT DOCUMENTS

| | | |
|---|---|---|
| JP | 2002349929 A | 12/2002 |
| JP | 2003150281 A | 5/2003 |

(Continued)

OTHER PUBLICATIONS

Japanese Office Action for JP2010-238094 mailed on Sep. 11, 2012.

*Primary Examiner* — Daniel Cavallari

(57) ABSTRACT

An equipment power management system in accordance with the present invention has a plurality of electrical devices and a control device. The electrical devices can operate in any one of multiple operational states different from each other in power consumption of a commercial power source. The control device switches the operational state of an electrical device to that of a smaller power consumption of the commercial power source in ascending order from the electrical device of the lowest priority when a receiving power amount of the whole equipment including the plurality of electrical devices exceeds a first threshold value until the receiving power amount falls below a second threshold value which is lower than or equal to the first threshold value.

2 Claims, 6 Drawing Sheets

(56) References Cited

U.S. PATENT DOCUMENTS

| | | | | |
|---|---|---|---|---|
| 2010/0038966 A1* | 2/2010 | Espeut, Jr. | ............... | H01H 9/26 |
| | | | | 307/68 |
| 2010/0156178 A1 | 6/2010 | Holmberg | | |
| 2012/0032636 A1 | 2/2012 | Bianco | ...................... | B60L 3/04 |
| | | | | 320/109 |

FOREIGN PATENT DOCUMENTS

| | | | |
|---|---|---|---|
| JP | 2004180404 A | 6/2004 | |
| JP | 2006230147 A | 8/2006 | |
| JP | 2010148351 A | 7/2010 | |
| JP | 2010161849 A | 7/2010 | |

\* cited by examiner

FIG. 5

| ELECTRICAL DEVICE ID | OPERATIONAL STATE | REMAINING BATTERY LEVEL OF SECONDARY BATTERY | CHARGING FLAG |
|---|---|---|---|

EQUIPMENT POWER MANAGEMENT SYSTEM

This present application is a divisional application of U.S. patent application Ser. No. 13/253,752 filed on Oct. 5, 2011, which claims priority from Japanese Patent Application No. 2010-238094, filed on Oct. 25, 2010 in Japan, the disclosure of which is incorporated herein by reference in its entirety.

1. TECHNICAL FIELD

The present invention relates to equipment power management systems and, in particular, to an equipment power management system for managing the receiving power amount of the whole equipment including a plurality of electrical devices.

2. BACKGROUND ART

The power consumption of the whole equipment including a plurality of electrical devices increases and decreases according to the operation condition of each electrical device. The amount of the maximum power consumption which increases and decreases is referred to as the peak power amount, and the time period when the peak power amount appears is referred to as the peak power time period. The basic rate of a commercial power supply is set according to the peak power amount. Therefore, for equipment utilizing a commercial power supply, it is important to reduce the peak power amount for cost reduction.

With respect to the technology of reducing the peak power amount of the whole equipment including a plurality of electrical devices, as related arts for example, the techniques described in Patent Documents 1 and 2 are publicly known.

Of the two documents, Patent Document 1 discloses a power receiving system for controlling the electric power of the whole equipment of a factory, a standard family or the like where various electrical devices are installed such as electronic devices and the like. This power receiving system includes an AC power storage unit, a switch unit for switching between the AC power storage unit and a commercial power source, and a control device for controlling the switch unit by detecting the receiving power amount. This power receiving system takes the commercial power source alone as the power supply source when the full load of the equipment does not exceed the contract power amount, and makes up the insufficient amount of the receiving power for the load from the AC power storage unit when the receiving power of the equipment is about to exceed the contract power amount. By virtue of this, the power amount received from the commercial power source is restrained under the contract power amount. Further, when the full load fluctuates under the contract power amount after the peak power time period, the receiving power is utilized to charge the AC power storage unit while supplying power to the full load of the equipment. By virtue of this, it is possible to get prepared for dealing with the power peak of the next day with the charged AC power storage unit without the power consumption due to discharging beyond the time period of the peak power consumption.

Further, Patent Document 2 discloses a power management system composed of a plurality of client computers and a management server. According to an instruction from the management server, each client computer can be switched from a state of being operated by an external power supply to a state of being operated by a built-in secondary battery, and vice versa. Further, according to another instruction from the management server, each client computer controls whether or not to allow the external power supply to charge the battery. The management server carries out the following controls based on the power load information received from the power company.

The power load information shows a temporal load change of the power supplied by the power company. The management server notifies all client computers of the prohibitions of charging the secondary battery and utilizing the external power supply during the time period when the power load exceeds a second threshold value. According to this notification, each client computer operates on the secondary battery, and stops charging the same. Further, the management server notifies all client computers of the permission of charging the secondary battery and the prohibition of utilizing the external power supply during the time period when the power load is lower than or equal to the second threshold value but higher than a first threshold value. According to this notification, each client computer operates on the secondary battery, and charges the same with the external power supply. Furthermore, the management server notifies all client computers of the permissions of charging the secondary battery and utilizing the external power supply during the time period when the power load is lower than or equal to the first threshold value. According to this notification, each client computer operates on the external power supply, and charges the secondary battery as necessary with the external power supply.

Further, in order to prevent the peak power from changing rapidly, the management server divides the plurality of client computers into a number of groups, and sends the above notification to each group at different times. For the same reason, the plurality of client computers belonging to the same group having received the above notification carry out a control corresponding to the notification with a time lag between the times different from each other.

On the other hand, for example, Patent Document 3 discloses an electrical device with a function of reducing the peak power autonomously. This electrical device described in Patent Document 3 realizes the reduction of the power supply amount from a power supply unit during the peak time period by optimizing the power consumptions between the power supply unit and a secondary battery. In particular, Patent Document 3 exemplarily shows a computer device as an example of the electrical device, and describes the performance of the following control.

First, the computer device is composed of a number of subsystems such as a CPU, hard disks, an inverter, and the like. Next, at the start time of the peak power reduction period (at 13:00, for instance), all of the subsystems constituting the computer device transit to the first stage at which the power is supplied from the secondary battery. Then, the sustaining time of the secondary battery is calculated from the discharge current and remaining level of the secondary battery to determine whether or not the secondary battery is sustainable until the end time of the peak power reduction period. If sustainable, then the first stage is maintained. If not, then the device proceeds to the next second stage.

At the second stage, the discharge current of the secondary battery is decreased by changing the power supply source for some of the subsystems (the inverter, for instance) from the secondary battery to the power supply unit. Then, the sustaining time of the secondary battery is calculated from the discharge current and remaining level of the secondary battery to determine whether or not the secondary battery is sustainable until the end time of the peak power reduction period. If sustainable, then the second stage is maintained. If not, then the device proceeds to the next third stage.

At the third stage, the discharge current of the secondary battery is further decreased by changing the CPU to a low-speed mode. Then, the sustaining time of the secondary battery is calculated from the discharge current and remaining level of the secondary battery to determine whether or not the secondary battery is sustainable until the end time of the peak power reduction period. If sustainable, then the third stage is maintained. If not, then the device proceeds to the next forth stage.

At the forth stage, the discharge current of the secondary battery is further decreased by changing the power supply source for the CPU from the secondary battery to the power supply unit. At the same time, the CPU is returned from the low-speed mode to the normal mode. Then, the sustaining time of the secondary battery is calculated from the discharge current and remaining level of the secondary battery to determine whether or not the secondary battery is sustainable until the end time of the peak power reduction period. If sustainable, then the forth stage is maintained. If not, then the device proceeds to the next fifth stage (the final stage).

At the fifth stage, the power supply unit is utilized as the power supply source for all subsystems of the computer.

[Patent Document 1] JP 2006-230147 A
[Patent Document 2] JP 2004-180404 A
[Patent Document 3] JP 2003-150281 A With respect to equipment including a plurality of electrical devices, it is possible to reduce the peak power amount of the whole equipment by providing each electrical device with a peak power reduction function such as that described in Patent Document 3. However, it is difficult to set a certain threshold value for the upper limit of the peak power amount such that the peak power amount of the whole equipment may not exceed the upper threshold value through the method of autonomously controlling each electrical device. Therefore, it is necessary to set up a mechanism for managing the power amount of the whole equipment as seen in Patent Document 1 or Patent Document 2.

Nevertheless, it is indispensable to provide the power receiving system described in Patent Document 1 with a large-scale device such as the AC power storage unit. On the other hand, although the power management system described in Patent Document 2 does not need a large-scale device of this kind, electrical devices of high priority and low priority included in the equipment are treated indiscriminately as the peak power reduction objects. In general, reducing the peak power of electrical devices will cause the electrical devices to lower their performances. Therefore, when reducing the peak power amount of the whole equipment in the power management system described in Patent Document 2, the performance of the electrical devices of high priority is lowered in the same manner as that of the electrical devices of low priority.

SUMMARY

In view of the above, an exemplary object of the present invention is to provide an equipment power management system for solving the above problem, that is, when reducing the peak power amount of the whole equipment, the performance of the electrical devices of high priority included in the equipment is lowered in the same manner as that of the electrical devices of low priority.

An aspect in accordance with the present invention provides an equipment power management system including: a plurality of electrical devices operable in any one of multiple operational states different from each other in power consumption of a commercial power source; and a control device for switching the operational state of an electrical device to that of a smaller power consumption of the commercial power source in ascending order from the electrical device of the lowest priority when a receiving power amount of the whole equipment including the plurality of electrical devices exceeds a first threshold value until the receiving power amount falls below a second threshold value which is lower than or equal to the first threshold value.

Another aspect in accordance with the present invention provides an equipment power management method to be carried out by a control device connected through a communication cable with a plurality of electrical devices operable in any one of multiple operational states different from each other in power consumption of a commercial power source, the method including switching the operational state of an electrical device to that of a smaller power consumption of the commercial power source in ascending order from the electrical device of the lowest priority when a receiving power amount of the whole equipment including the plurality of electrical devices exceeds a first threshold value until the receiving power amount falls below a second threshold value which is lower than or equal to the first threshold value.

Still another aspect in accordance with the present invention provides a control device including: a communication interface unit for carrying out communications with a plurality of electrical devices operable in any one of multiple operational states different from each other in power consumption of a commercial power source; and a power reduction control unit for switching the operational state of an electrical device to that of a smaller power consumption of the commercial power source in ascending order from the electrical device of the lowest priority when a receiving power amount of the whole equipment including the plurality of electrical devices exceeds a first threshold value until the receiving power amount falls below a second threshold value which is lower than or equal to the first threshold value.

Because the present invention adopts the configurations as described hereinabove, when reducing the peak power amount of the whole equipment, it is possible to prevent the electrical devices of high priority included in the equipment from lowering their performance in the same manner as those of low priority.

BRIEF DESCRIPTION OF DRAWINGS

FIG. 5 is a diagram showing an example of the state information of electrical devices held by the control device in the equipment power management system in accordance with the second exemplary embodiment of the present invention.

EXEMPLARY EMBODIMENTS

Next, referring to the accompanying drawings, descriptions will be made in detail with respect to exemplary embodiments of the present invention.

A First Exemplary Embodiment

Figure 1:
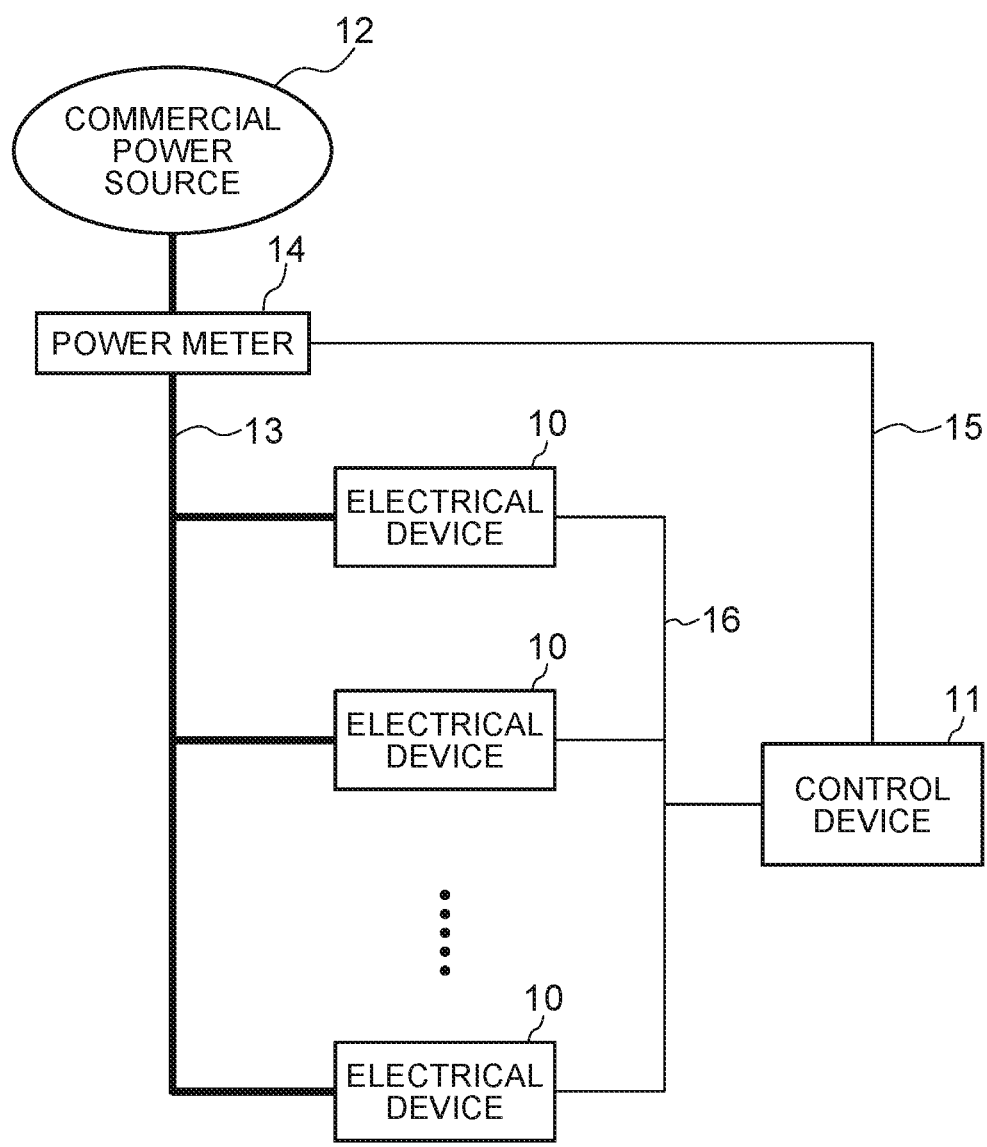
FIG. 1 is a block diagram of an equipment power management system in accordance with a first exemplary embodiment of the present invention.

Referring to FIG. 1, an equipment power management system in accordance with a first exemplary embodiment of the present invention has a plurality of electrical devices 10, a control device 11 for controlling the receiving power amount of the whole equipment, and a power meter 14.

Each electrical device 10 is an IT device having a computer such as a server device having a CPU and memory, a storage device, a network device, or the like. The plurality of electrical devices 10 may be either IT devices of the same kind or IT devices of different kinds mixed together. Further, electrical devices other than IT devices may as well be included.

The electrical devices 10 are operated by the power supplied from a commercial power source 12 through a power cable 13. Further, the electrical devices 10 are connected to the control device 11 through a communication cable 16. The electrical devices 10 have a function to be operable in any of a plurality of operational states different in power consumption of the commercial power source 12. Further, the electrical devices 10 have a function to operate in an operational state instructed by a control signal received from the control device 11 through the communication cable 16.

One operational state of the electrical devices 10 is to operate normally with the commercial power source 12 as the power source. To operate normally means to operate in a normal mode which is not a low power consumption mode. This operational mode will be referred to as the normal operational state hereinbelow.

Further, another operational state of the electrical devices 10 is to operate in a low power consumption mode with the commercial power source 12, for example, as the power source. This operational state will be referred to as the low power consumption operational state hereinbelow.

Further, still another operational state of the electrical devices 10 is to operate in the low power consumption mode with a secondary battery, for example, as the power source. This operational state will be referred to as the secondary battery operational state hereinbelow. Herein, the state of operating an electrical device 10 with the secondary battery includes a state of supplying all the power for the electrical device 10 from the secondary battery, and a state of supplying a part of the power for the electrical device 10 from the commercial power source 12, and the rest from the secondary battery. In the first exemplary embodiment, the former state (the state of supplying all the power for the electrical device 10 from the secondary battery) is utilized. However, the latter state (the state of supplying a part of the power for the electrical device 10 from the commercial power source 12, and the rest from the secondary battery) may as well be utilized.

In general, the power amount of the commercial power source 12 consumed by the electrical devices 10 becomes the largest in the normal operational state, the second largest in the low power consumption operational state, and the smallest or the least in the secondary battery operational state.

The electrical devices 10 need to have a least two operational states different in power consumption of the commercial power source 12. For example, the electrical devices 10 may have the two of the normal operational state and the low power consumption operational state. Further, the electrical devices 10 may as well have the two of the normal operational state and the secondary battery operational state. Further, the electrical devices 10 may as well have the three of the normal operational state, the low power consumption operational state, and the secondary battery operational state. Furthermore, the electrical devices 10 may as well have more than three operational states different in power consumption of the commercial power source 12.

The power meter 14 measures the receiving power amount of the whole equipment. The power meter 14 is connected with the control device 11 through a communication cable 15. The power meter 14 periodically notifies the control device 11 of the measured receiving power amount through the communication cable 15. Hereinbelow, P will be introduced to indicate the receiving power amount of the whole equipment measured with the power meter 14.

The control device 11 is connected with the power meter 14 through the communication cable 15 and with each electrical device 10 through the communication cable 16. The control device 11 has a function to compare the receiving power amount P received from the power meter 14 through the communication cable 15 with a preset first threshold value P1. Further, the control device 11 has a function to repeat a predetermined process until the receiving power amount P falls below a second threshold value P2 when the above compared result shows that the receiving power amount P of the whole equipment exceeds the first threshold value P1. The second threshold value P2 is set to be the same value as the first threshold value P1, or a value smaller than the first threshold value P1 by a preset value X as an allowance.

The aforementioned predetermined process refers to a process for selecting an electrical device 10 as the power reduction object from the electrical devices 10 operating in an operational state other than that of the least power consumption of the commercial power source 12, and sending a control signal to the selected electrical device 10 through the communication cable 16 to switch the operational state of that electrical device 10 to that of a smaller power consumption of the commercial power source 12.

When selecting an electrical device 10 as the object of power reduction, the control device 11 selects the electrical device 10 of the lowest priority from the electrical devices 10 operating in an operational state other than that of the least power consumption of the commercial power source 12. Further, when there are a plurality of electrical devices 10 of the lowest priority, the control device 11 preferentially selects the electrical device 10 operating in the operational state of the largest power consumption of the commercial power source 12. For example, suppose there are ten electrical devices 10 of the lowest priority in total among the electrical devices 10 operating in an operational state other than that of the least power consumption of the commercial power source 12. Further, suppose six out of those ten electrical devices 10 are operating in the normal operational state, and the remaining four are operating in the low power consumption operational state. In this case, the electrical device as the reduction object is preferentially selected from the six operating in the normal operational state. At the time, an arbitrary method may be employed to select the electrical device as the reduction object from the six candidates. For example, any one of those electrical devices 10 may be selected on a random basis. Further, the electrical device 10 of the least load may be preferentially selected. Further, the electrical device 10 with the secondary battery at the highest remaining battery level may as well be preferentially selected.

Each time the aforementioned predetermined process is carried out, the number of the electrical devices 10 to be selected as the object of power reduction may be either one or more than one.

Further, the control device 11 may as well classify the electrical devices of an identical priority into an identical group and, in selecting the aforementioned reduction object, select one, more than one, or all of the electrical devices operating in an operational state of a larger power consumption of the commercial power source from those included in the group of the electrical devices of the lowest priority among the electrical devices 10 operating in an operational state other than that of the least power consumption of the commercial power source. For example, suppose there are two priorities: the high priority and the low priority; the high-priority group includes five electrical devices while the low-priority group includes ten electrical devices. Further, suppose the five electrical devices included in the high-priority group are all operating in the normal operational state. Further, suppose the ten electrical devices included in the low-priority group are all operating in the low power consumption operational state. In this case, the control device 11 selects one, more than one, or all as the object(s) of power reduction from the ten electrical devices of the low-priority group operating in the low power consumption operational state.

The priorities of the electrical devices 10 may be predetermined as fixed values. Further, the priorities of the electrical devices 10 may as well be variable values revised periodically. In either case, reducing the power amount of the commercial power source 12 consumed by an electrical device 10 causes the electrical device 10 to lower its performance. Therefore, it is necessary to assign a comparatively high priority to the electrical devices 10 the performance of which is not desirably to be lowered.

Further, the priority of an electrical device 10 which is an IT device may as well be a value determined according to the service level of the application program executed by the computer constituting that IT device. For example, suppose there are two service levels: one is the service of a best-effort type, and the other is the service of a guarantee type. Then, a low priority may be assigned to the IT device carrying out only the application program to provide the service of a best-effort type in comparison with the IT device carrying out the application program to provide the service of a guarantee type.

Further, the control device 11 has a function to compare the receiving power amount P of the whole equipment received from the power meter 14 through the communication cable 15 with a preset third threshold value P3. The third threshold value P3 is set to be an even smaller value than the second threshold value P2. Further, the control device 11 has a function to repeat a predetermined process with the receiving power amount P in the range of not exceeding the third threshold value P3 when the above compared result shows that the receiving power amount P of the whole equipment is detected to be below the third threshold value P3. The aforementioned predetermined process refers to a process for selecting an electrical device 10 as the object of power increase from the electrical devices 10 operating in an operational state other than that of the largest power consumption of the commercial power source, and sending a control signal to the selected electrical device 10 through the communication cable 16 to switch the operational state of that electrical device 10 to that of a larger power consumption of the commercial power source 12.

When selecting an electrical device 10 as the object of power increase, the control device 11 selects the electrical device 10 of the highest priority from the electrical devices 10 operating in an operational state other than that of the largest power consumption of the commercial power source 12. Further, when there are a plurality of electrical devices 10 of the highest priority, the control device 11 preferentially selects the electrical device 10 operating in the operational state of the lowest power consumption of the commercial power source 12. For example, suppose there are eight electrical devices 10 of the highest priority in total among the electrical devices 10 operating in an operational state other than that of the largest power consumption of the commercial power source 12. Further, suppose five out of those eight electrical devices 10 are operating in the low power consumption operational state, and the remaining three are operating in the secondary battery operational state. In this case, the electrical device as the increase object is preferentially selected from the three operating in the secondary battery operational state. At the time, an arbitrary method may be employed to select the electrical device as the increase object from the three candidates. For example, any one of those electrical devices 10 may be selected on a random basis. Further, the electrical device 10 of the largest load may be preferentially selected. Further, the electrical device 10 with the secondary battery at the lowest remaining battery level may as well be preferentially selected.

Each time the aforementioned predetermined process is carried out, the number of the electrical devices 10 to be selected as the object of power increase may be either one or more than one.

Further, the control device 11 may as well classify the electrical devices of an identical priority into an identical group and, in selecting the aforementioned increase object, select one, more than one, or all of the electrical devices operating in an operational state of a smaller power consumption of the commercial power source from those included in the group of the electrical devices of the highest priority among the electrical devices 10 operating in an operational state other than that of the largest power consumption of the commercial power source. For example, suppose there are two priorities: the high priority and the low priority; the high-priority group includes five electrical devices while the low-priority group includes ten electrical devices. Further, suppose two of the five electrical devices included in the high-priority group are operating in the low power consumption operational state, and the remaining three are operating in the normal operational state. Further, suppose the ten electrical devices included in the low-priority group are all operating in the secondary battery operational state. In this case, the control device 11 selects one, or all as the object(s) of power increase from the two electrical devices of the high-priority group operating in the low power consumption operational state.

In the above explanation, the third threshold value was set to be a fixed value. However, it may as well be set as a variable value. When the third threshold value is a variable value, the control device 11 may determine the third threshold value by the following method, and utilize the determined third threshold value to carry out the control with respect to power increase of the electrical devices 10.

First, the control device 11 selects an electrical device 10 as the increase object operating in the operational state of the least power consumption of the commercial power source from the electrical devices of the highest priority among the electrical devices 10 operating in an operational state other than that of the largest power consumption of the commercial power source. The number of the electrical devices 10 to be selected as the increase object is set to be one, for example. However, more than one of the electrical devices 10 may as well be selected as the increase objects.

Next, assuming that the operational state of the electrical device 10 selected above is switched to that of the one-level larger power consumption of the commercial power source, the control device 11 calculates the difference between the power consumption of the commercial power source for the electrical device 10 after switching and that before switching. The calculation method may be arbitrary. For example, at the time of switching the operational state to that of the one-level larger power consumption of the commercial power source, some actual measured value and the like may be utilized as the basis to find out in advance how much the power consumption of the commercial power source will increase for each electrical device 10, associating the same with the identifier of each electrical device 10, storing the same into a storage portion, and then finding the difference by referring to the storage portion.

Next, the control device 11 determines the value of subtracting the difference calculated above from the second threshold value P2 as the third threshold value P3. Then, when the receiving power amount P falls below the third threshold value P3, the control device 11 actually switches the operational state of the electrical device 10 selected as the increase object to that of the one-level larger power consumption of the commercial power source.

Further, the control device 11 has a function to control the timings for starting and stopping the charging of the electrical devices 10 having a secondary battery. For example, under the condition that there is no electrical device 10 operating in an operational state other than that of the largest power consumption of the commercial power source, when the receiving power amount P falls below the second threshold value P2, the control device 11 sends an instruction to the electrical device with the secondary battery at an insufficient remaining battery level through the communication cable 16 to carry out the charging of the secondary battery. If there are a plurality of electrical devices with secondary batteries at an insufficient remaining battery level, the control device 11 may preferentially select the electrical device with the secondary battery at the lowest remaining battery level. Further, the control device 11 may repeat selecting the electrical device 10 with the secondary battery at the lowest remaining battery level, and instructing the selected electrical device 10 to start charging the secondary battery, with the receiving power amount P in the range of not exceeding the second threshold value P2. By virtue of such kind of control, it is possible to eliminate the bias in the remaining battery level among the secondary batteries of the plurality of electrical devices 10, and maintain the same at an equivalent level.

Figure 2:
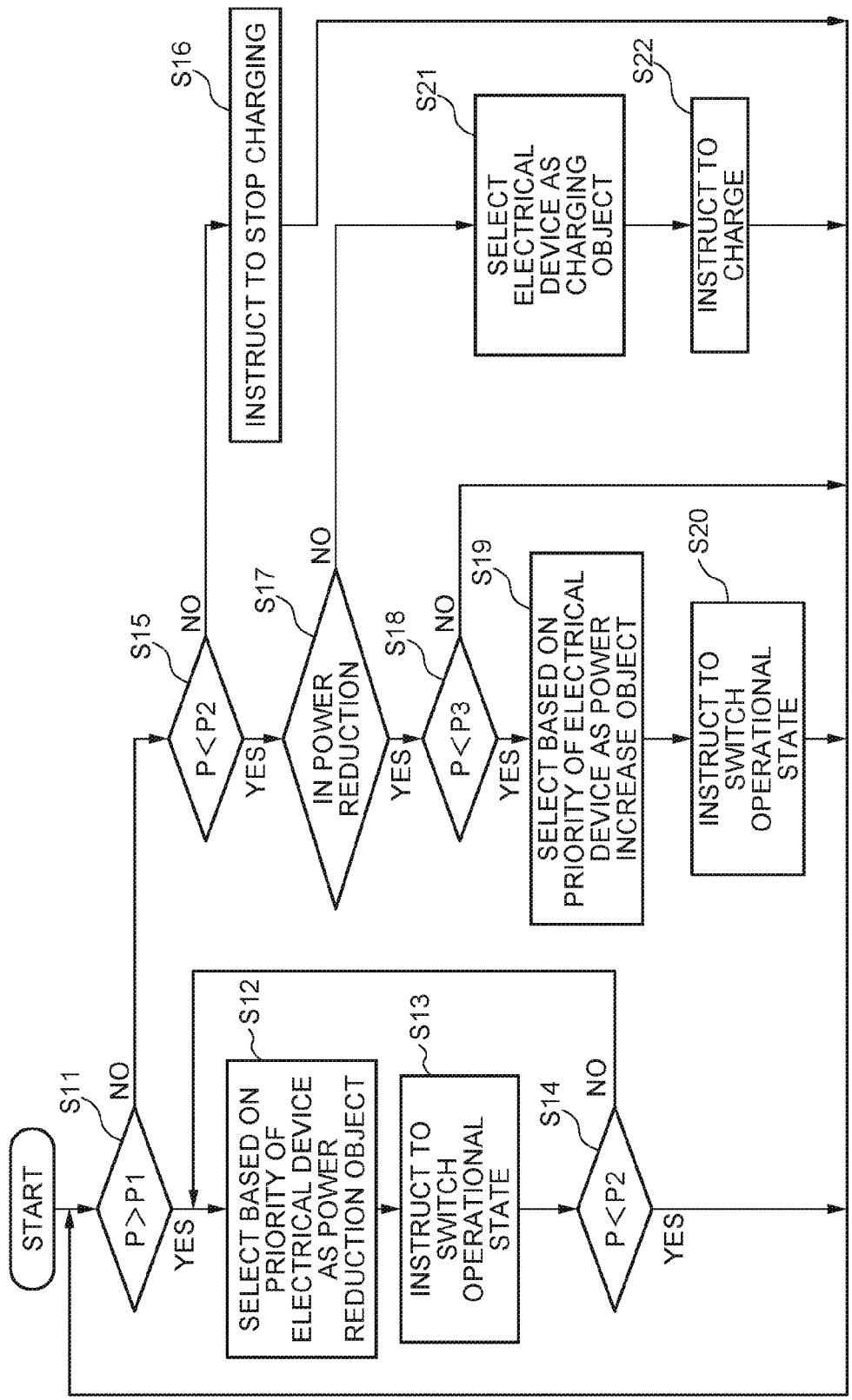
FIG. 2 is a flowchart showing a processing example of a control device in the equipment power management system in accordance with the first exemplary embodiment of the present invention.

FIG. 2 is a flowchart showing an example of the process carried out by the control device 11. Next, referring to FIGS. 1 and 2, the behavior of the first exemplary embodiment will be explained.

The control device 11 periodically receives the receiving power amount P of the whole equipment from the power meter 14 through the communication cable 15. The control device 11 compares the receiving power amount P received from the power meter 14 with the first threshold value P1 (S11). When detecting the receiving power amount P to be over the first threshold value P1, the control device 11 carries out the following control to reduce the receiving power amount.

The control device 11 first selects an electrical device 10 as the object of power reduction based on the priority of the electrical devices 10 (S12). The control device 11 next sends an instruction to the selected electrical device 10 through the communication cable 16 to switch the operational state to that of the one-level smaller power consumption of the commercial power source (S13). Then, the control device 11 compares the receiving power amount P to be received thereafter from the power meter 14 with the second threshold value P2 (S14). The control device 11 repeats the loop process from step S12 to step S14 until the receiving power amount P falls below the second threshold value P2. Then, on detecting the receiving power amount P to be below the second threshold value P2, the control device 11 returns to the process of step S11.

In the above manner, when the receiving power amount P of the whole equipment exceeds the first threshold value P1 due to load increase of the electrical devices 10, by increasing the ratio of the electrical devices 10 operating in operational states of lower power consumptions of the commercial power source, the receiving power amount P of the whole equipment is controlled to fall below the second threshold value P2 which is lower than or equal to the first threshold value P1.

On the other hand, when detecting that the receiving power amount P of the whole equipment to be not over the first threshold value P1, the control device 11 compares the receiving power amount P with the second threshold value P2 (S15). Then, if the receiving power amount P is not below the second threshold value P2, then the control device 11 returns to the process of step S11 through step S16. On the contrary, if the receiving power amount P is below the second threshold value P2, then the control device 11 determines whether there is any electrical device 10 in the power reduction (S17). An electrical device 10 in the power reduction refers to that operating in an operational state other than that of the largest power consumption of the commercial power source.

If there are electrical devices 10 in the power reduction, then the control device 11 determines whether the receiving power amount P is below the third threshold value P3 even lower than the second threshold value P2 (S18). If the receiving power amount P is not below the third threshold value P3, then the control device 11 returns to the process of step S11. If the receiving power amount P is below the third threshold value P3, then the control device 11 carries out the following control to increase the power for the electrical devices 10 in the power reduction.

The control device 11 first selects an electrical device 10 as the object of power increase from the electrical devices 10 in the power reduction based on the priority of the electrical devices 10 (S19). The control device 11 next sends an instruction to the selected electrical device 10 through the communication cable 16 to switch the operational state to that of the one-level larger power consumption of the commercial power source (S20). Then, the control device 11 returns to the process of step S11. Thereafter, when detecting the receiving power amount P to be still below the third threshold value P3 (YES in S18), the control device 11 carries out the same switching control as above for another electrical device 10 in the power reduction.

By virtue of the control as above, it is possible to maintain a small ratio of the electrical devices 10 operating in operational states of smaller power consumptions of the commercial power source 12 with the receiving power amount P of the whole equipment in the range of not exceeding the first threshold value P1.

Further, when the receiving power amount P of the whole equipment is below the second threshold value P2 and there is no electrical device 10 in the power reduction (NO in step S17), the control device 11 selects an electrical device 10 with the secondary battery at an insufficient remaining battery level as the charging object (S21). Next, the control device 11 instructs the selected electrical device 10 to carry out charging through the communication cable 16 (S22). Thereafter, when detecting the receiving power amount P to be still below the second threshold value P2 under the condition of the absence of electrical devices 10 in the power reduction (NO in S17), the control device 11 carries out the same control as above to instruct another electrical device 10 with the secondary battery at an insufficient remaining battery level to start charging.

After the electrical device 10 completes the charging of the secondary battery, it automatically stops the charging behavior. Further, even though electrical devices 10 having started charging the secondary batter has not completed charging the secondary battery, it will stop the charging behavior on receiving a charging stop instruction from the control device 11 through the communication cable 16. When the receiving power amount P of the whole equipment exceeds the second threshold value P2 due to the increased load of the electrical devices 10, the control device 11 sends the charging stop instruction through the communication cable 16 to the electrical device 10 charging the secondary battery (S16).

Figure 3:
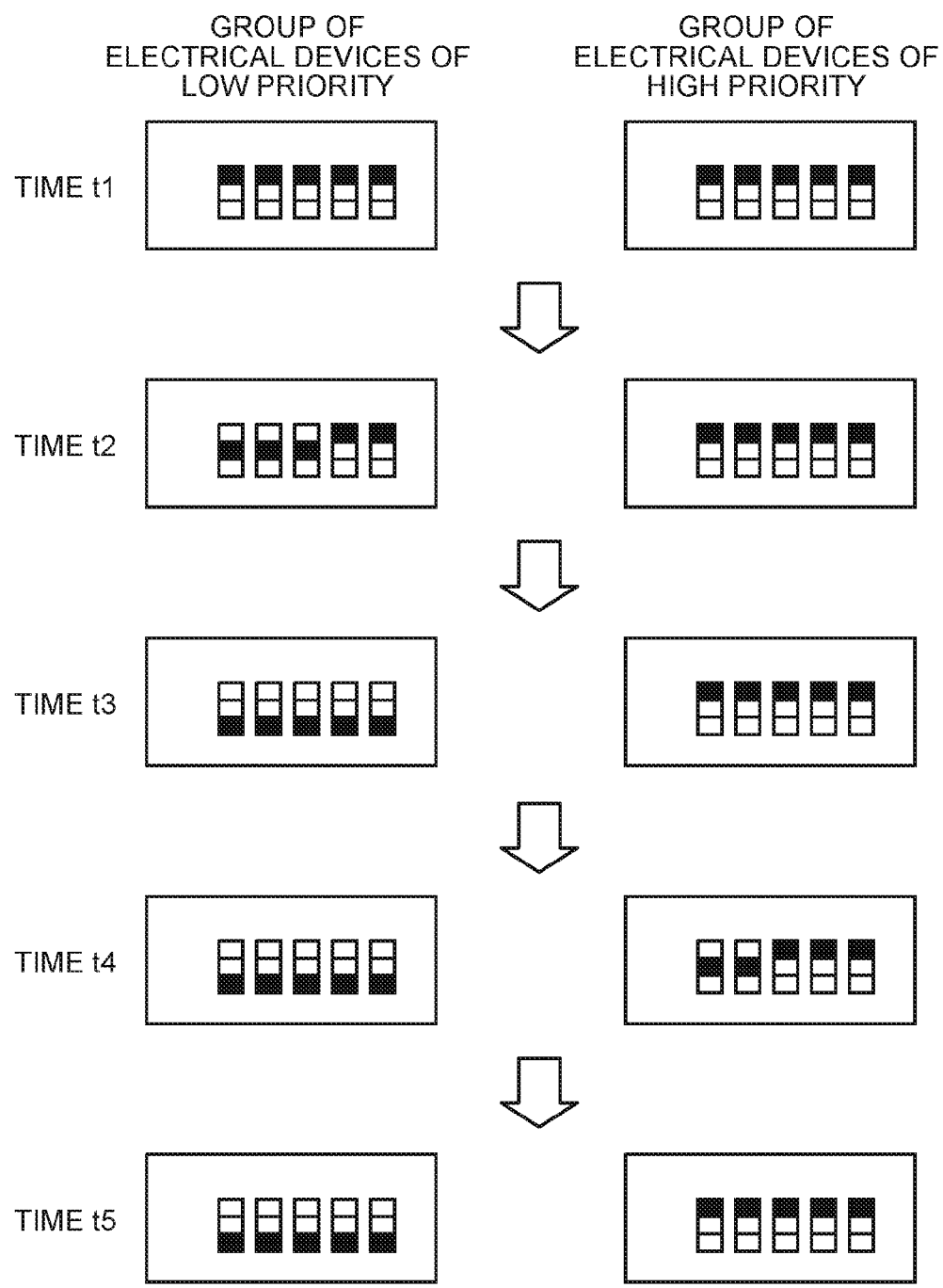
FIG. 3 is a diagram showing an example of the operational state transition of electrical devices in the equipment power management system in accordance with the first exemplary embodiment of the present invention.

FIG. 3 schematically shows an example of the operational state transition of the electrical devices 10. In the example of FIG. 3, there are ten electrical devices 10 in total. Further, there two types of priorities: the high priority and the low priority. There are five electrical devices of the high priority and five electrical devices of the low priority. The figure of three vertically piled-up quadrangles corresponds to one electrical device. Among the three quadrangles, the position of the black painted quadrangle indicates the present operational state of an electrical device 10. That is, in the example of FIG. 3, an electrical device 10 can take three operational states of the largest, the second largest, and the least power consumptions of the commercial power source.

At the time t1, all electrical devices 10 are operating in the operational state of the largest power consumption of the commercial power source. Because the load of the electrical devices 10 increases and thus the power consumption of the whole equipment comes to exceed the first threshold value P1, at the time t2, the operational state of some electrical devices 10 of the low priority is switched to that of the second largest power consumption of the commercial power source. Further, at the time of t3 when the load further increases, the operational state of all electrical devices 10 of the low priority is switched to that of the least power consumption of the commercial power source. However, at both of the times t2 and t3, the electrical devices 10 of the high priority are still operating in the operational state of the largest power consumption of the commercial power source. Therefore, the performances of the electrical devices 10 of the high priority will not be lowered.

At the time t4, because it becomes difficult to restrict the power consumption of the whole equipment below the first threshold value P1 only by the power reduction of the electrical devices 10 of the low priority, out of necessity, the operational state of some electrical devices 10 is switched to that of the second largest power consumption of the commercial power source. However, at the time t5, taking the opportunity of the fact that the load has decreased and thus the power consumption of the whole equipment has fallen below the third threshold value P3, all electrical devices 10 of the high priority are operating again in the operational state of the largest power consumption of the commercial power source.

According to the first exemplary embodiment in the above manner, when reducing the receiving power amount of the whole equipment, it is possible to prevent the electrical devices of the high priority included in the equipment from lowering the performance in the same manner as the electrical devices of the low priority.

A Second Exemplary Embodiment

Next, explanations will be made with respect to an equipment power management system in accordance with a second exemplary embodiment of the present invention.

Figure 4:
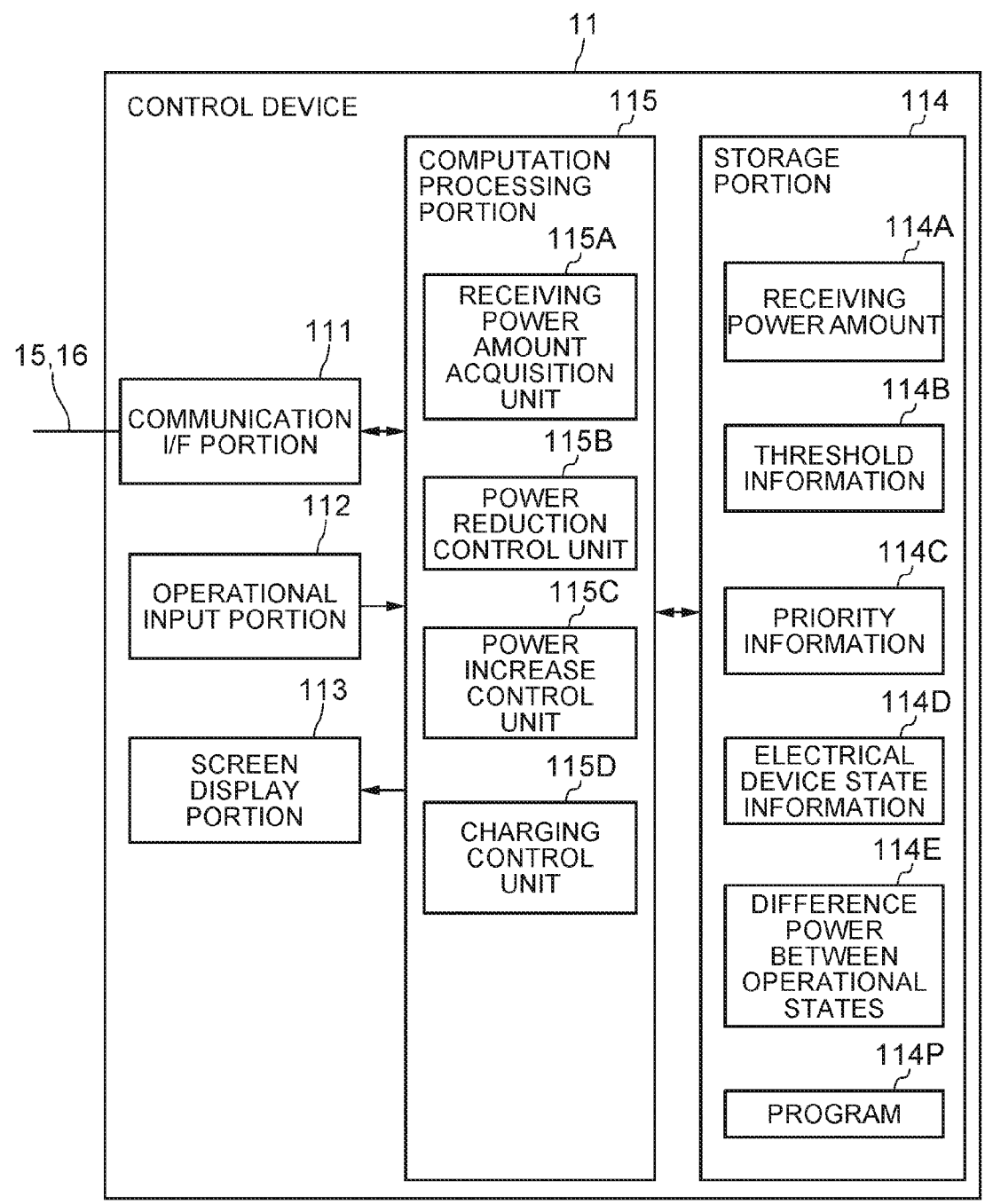
FIG. 4 is a block diagram of a control device in an equipment power management system in accordance with a second exemplary embodiment of the present invention.

FIG. 4 is a block diagram of another control device 11 utilized in the equipment power management system of the second exemplary embodiment. Referring to FIG. 4, the control device 11 has, as the main functional portions, a communication interface portion 111 (to be referred to as a communication I/F portion hereinbelow), an operational input portion 112, a screen display portion 113, a storage portion 114, and a computation processing portion 115.

The communication I/F portion 111 is formed of a dedicated data communication circuit, having a function to carry out data communications with various devices such as the power meter 14, the electrical devices 10 and the like connected through the communication cables 15 and 16.

The operational input portion 112 is composed of operational input devices such as a keyboard, a mouse and the like, having a function to detect operator's manipulations and output the information to the computation processing portion 115. Various pieces of information are inputted from the operational input portion 112, such as the aftermentioned threshold information, priority information, difference power between operational states, and the like.

The screen display portion 113 is constituted by a screen display device such as an LCD, a PDP, or the like, having a function to display on the screen various kinds of information such as the present operational state of an electrical device 10 and the like according to the instruction from the computation processing portion 115.

The storage portion 114 is composed of storage devices such as hard disks, memories and the like, having a function to store processing information and a program 114P needed for various processes in the computation processing portion 115. The program 114P is a computer program to be read into the computation processing portion 115 and executed to realize various processing portions, and is read into the storage portion 114 in advance from an external device (not shown) or an external medium (not shown) via the data I/O function of the communication I/F portion 111 and the like. As the main processing information stored in the storage portion 114, there are receiving power amount 114A, threshold information 114B, priority information 114C, electrical device state information 114D, and difference power between operational states 114E.

The receiving power amount 114A shows the latest receiving power amount P received from the power meter 14.

The threshold information 114B shows the first threshold value P1, the second threshold value P2 and the third threshold value P3 for comparison with the receiving power amount.

The priority information 114C shows the priority of each electrical device 10.

The electrical device state information 114D shows various states of each electrical device 10. FIG. 5 shows a configuration example of the electrical device state information 114D. The electrical device state information 114D in this example has an electrical device ID, an operational state, a secondary battery remaining battery level, and a charging flag for each electrical device 10. The present operational state of an electrical device 10 is described in the operational state. The charging flag shows whether or not the secondary battery is being charged.

The difference power between operational states 114E is the increase amount of the power consumption of the commercial power source for the corresponding electrical device 10 when switching the operational state to that of the one-level larger power consumption of the commercial power source.

The computation processing portion 115 has a microprocessor such as a CPU or the like, and a peripheral circuit, having a function to read in the program 114P from the storage portion 114 and execute the same for operation together with the aforementioned hardware and the program 114P to realize the various processing portions. As the main processing portions realized by the computation processing portion 115, there are a receiving power amount acquisition unit 115A, a power reduction control unit 115B, a power increase control unit 115C, and a charging control unit 115D.

The receiving power amount acquisition unit 115A has a function to receive the receiving power amount P of the whole equipment from the power meter 14, and store the same as the receiving power amount 114A into the storage portion 114.

The power reduction control unit 115B has a function to carry out the control for switching the operational state of an electrical device 10 to that of a smaller power consumption of the commercial power source in ascending order from the electrical device 10 of the lowest priority until the receiving power amount P falls below the second threshold value P2 when the receiving power amount P of the whole equipment exceeds the first threshold value P1. The power reduction control unit 115B obtains the receiving power amount P of the whole equipment from the receiving power amount 114A. Further, the power reduction control unit 115B obtains the first threshold value P1 and the second threshold value P2 from the threshold information 114B. Further, the power reduction control unit 115B obtains the priority of each electrical device 10 from the priority information 114C. Further, the power reduction control unit 115B refers to the electrical device state information 114D to recognize the present operational state of each electrical device 10. Further, the power reduction control unit 115B sends a signal through the communication I/F portion 111 to the electrical device 10 of the reduction object to instruct the switching of the operational state, and receives the response to the instruction. Further, the power reduction control unit 115B analyzes the received response and, according to the analysis, updates the operational state in the electrical device state information 114D. In particular, if the response is positive, then the operational state is updated just as instructed; if the response is negative, then the operational state is not updated. Furthermore, the power reduction control unit 115B has a function to govern the general control with respect to the power reduction in the second exemplary embodiment.

The power increase control unit 115C has a function to select an electrical device 10 of the highest priority as the increase object from the electrical devices 10 operating in an operational state other than that of the largest power consumption of the commercial power source when the receiving power amount P is below the third threshold value P3, and switch the operational state of the selected electrical device 10 to that of a larger power consumption of the commercial power source. The power increase control unit 115C repeats this function with the receiving power amount P in the range of not exceeding the second threshold value P2. The power increase control unit 115C obtains the receiving power amount P of the whole equipment from the receiving power amount 114A. Further, the power increase control unit 115C obtains the second threshold value P2 and the third threshold value P3 from the threshold information 114B. Further, the power increase control unit 115C obtains the priority of each electrical device 10 from the priority information 114C. Further, the power increase control unit 115C refers to the electrical device state information 114D to recognize the present operational state of each electrical device 10. Further, when generating the third threshold value by itself, the power increase control unit 115C refers to the difference power between operational states 114E needed for the generation from the storage portion 114. Further, the power increase control unit 115C sends a signal through the communication I/F portion 111 to the electrical device 10 of the increase object to instruct the switching of the operational state, and receives the response to the instruction. Further, the power increase control unit 115C analyzes the received response and, according to the analysis, updates the operational state in the electrical device state information 114D. In particular, if the response is positive, then the operational state is updated just as instructed; if the response is negative, then the operational state is not updated. Furthermore, the power increase control unit 115C has a function to govern the general control with respect to the power increase in the second exemplary embodiment.

The charging control unit 115D has a function to select the electrical device 10 with the secondary battery at the lowest remaining battery level when the receiving power amount P is below the second threshold value P2 under the condition of the absence of electrical devices 10 in the power reduction, and send a signal to instruct the selected electrical device 10 to start charging the secondary battery. The charging control unit 115D obtains the receiving power amount P of the whole equipment from the receiving power amount 114A. Further, the charging control unit 115D obtains the second threshold value P2 from the threshold information 114B. Further, the charging control unit 115D refers to the electrical device state information 114D to recognize the remaining battery level of the secondary battery of each electrical device 10 and whether or not the secondary battery is being charged. Further, the charging control unit 115D sends the signal through the communication I/F portion 111 to the electrical device 10 of the charging object to instruct the starting of charging, and receives the response to the instruction. Further, the charging control unit 115D analyzes the received response and, according to the analysis, updates the charging flag in the electrical device state information 114D. In particular, if the response is positive, then the charging flag is updated to being charged; if the response is negative, then the charging flag is not updated. Further, the charging control unit 115D receives the notification of the remaining battery level of the secondary battery received from each electrical device 10 through the communication I/F portion 111, and updates the remaining battery level of the secondary battery in the electrical device state information 114D. Further, the charging control unit 115D sends a signal through the communication I/F portion 111 to the electrical device 10 charging the secondary battery to instruct the stopping of charging when the receiving power amount exceeds the second threshold value P2, and receives the response to the instruction. Further, the charging control unit 115D analyzes the received response and, according to the analysis, updates the charging flag in the electrical device state information 114D. In particular, if the response is positive, then the charging flag is updated to charging stopped; if the response is negative, then the charging flag is not updated.

Next, explanations will be made with respect to the electrical device 10 utilized in the equipment power management system in accordance with the second exemplary embodiment of the present invention.

Figure 6:
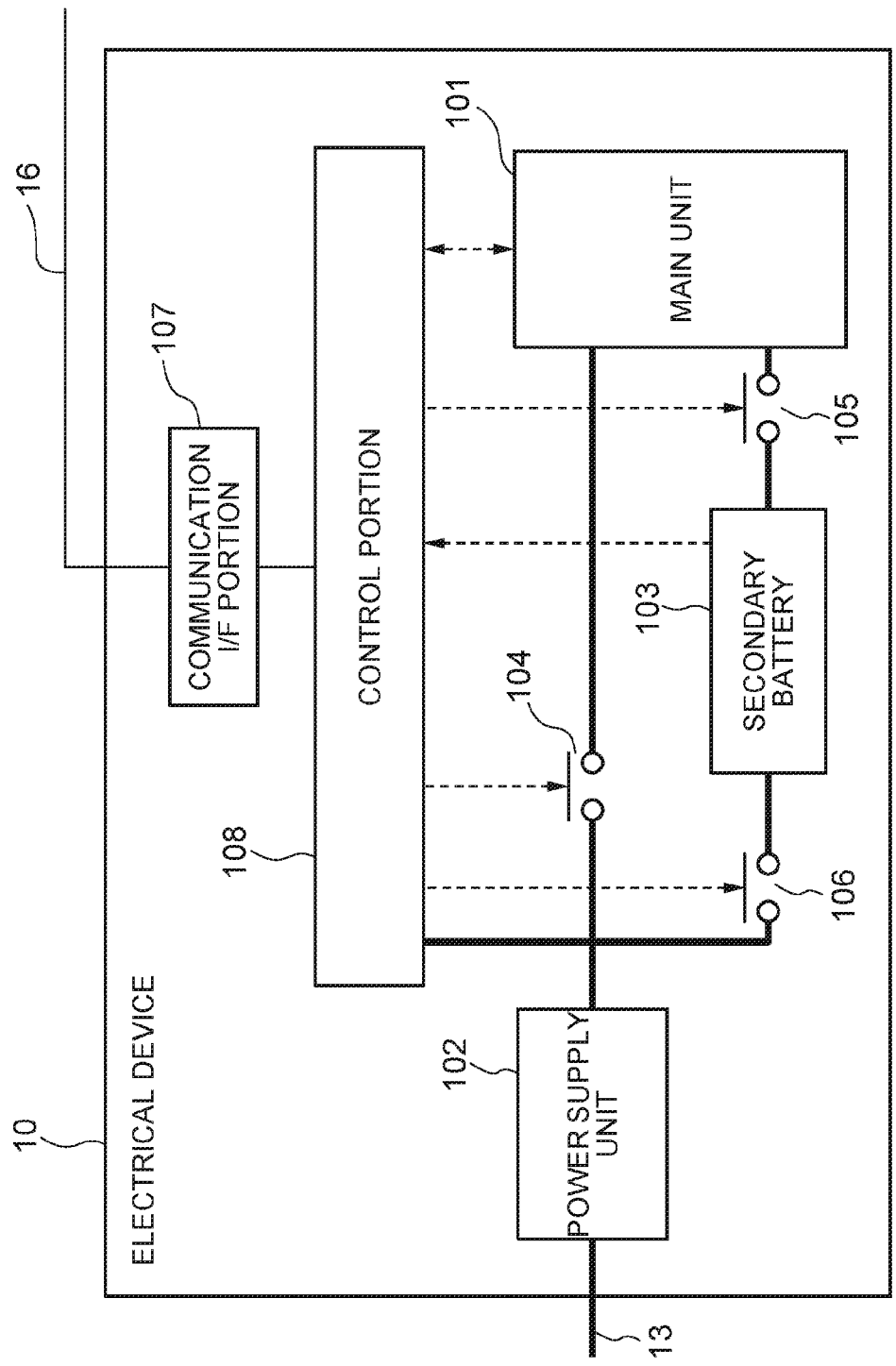
FIG. 6 is a block diagram of the electrical devices in the equipment power management system in accordance with the second exemplary embodiment of the present invention.

FIG. 6 is a block diagram of the electrical device 10 utilized in the equipment power management system in accordance with the second exemplary embodiment. Referring to FIG. 6, the electrical devices 10 has a main unit 101 consuming electric power, a power supply unit 102 (PSU) for supplying the power received from a commercial power source through a power cable 13 to the main unit 101 and a secondary battery 103 to be charged by the power supplied from the power supply unit 102 for supplying the charged electricity to the main unit 101, switches 104 to 106, a communication I/F portion 107, and a control portion 108.

If the electrical device 10 is an IT device, for example, then the main unit 101 is composed of a CPU, memories, and the like. Further, the main unit 101 can switch from a normal operation to a low power consumption operation requiring smaller power consumption than the normal operation, or conversely, switch from the low power consumption operation to the normal operation. The low power consumption operation requiring smaller power consumption than the normal operation is referred to as a power capping function or a power cap. Generally, because the CPU and memories reduce the power consumption if their operating frequency is lowered, it is possible to adjust the maximum power consumption through a plurality of stages by limiting the maximum operating frequency. Further, it is possible to reduce the power consumption for the HDD and fan by decreasing their rotation numbers.

The secondary battery 103 is configured by such as a lithium-ion battery and the like. The power supply unit 102 serves to convert the AC power received from the commercial power source through the power cable 13 into a DC power of a predetermined voltage and supply the latter to the inside of the device. The communication I/F portion 107 is formed of a dedicated data communication circuit, having a function to carry out data communications with various devices such as the control device 11 and the like connected through the communication cable 16.

The switch 104 is connected between the power supply unit 102 and the main unit 101. If the switch 104 is turned on, then power is supplied from the power supply unit 102 to the main unit 101. The switch 105 is connected between the secondary battery 103 and the main unit 101. If the switch 105 is turned on, then power is supplied from the secondary battery 103 to the main unit 101. The switch 106 is connected between the power supply unit 102 and the secondary battery 103. If the switch 106 is turned on, then the power supply unit 102 charges the secondary battery 103.

The control portion 108 operates on the power supplied from the power supply unit 102. The control portion 108 has a function to switch the operational state of the electrical device 10 according to the instruction received from the control device 11 through the communication OF portion 107, and a function to start and stop charging the secondary battery 103.

In particular, on receiving the instruction to switch from the normal operational state to the low power consumption operational state, the control portion 108 turns on the switch 104 and turns off the switch 105 to switch the main unit 101 from the normal operation to the low power consumption operation. Further, on receiving the instruction to switch from the low power consumption operational state to the secondary battery operational state, the control portion 108 turns off the switch 104 and turns on the switch 105 to keep the main unit 101 in the state of the low power consumption operation as it is. Further, on receiving the instruction to switch from the secondary battery operational state to the low power consumption operational state, the control portion 108 turns on the switch 104 and turns off the switch 105 to keep the main unit 101 in the state of the low power consumption operation as it is. Further, on receiving the instruction to switch from the low power consumption operational state to the normal operational state, the control portion 108 turns on the switch 104 and turns off the switch 105 to switch the main unit 101 form the low power consumption operation to the normal operation. In whichever case, when the switching is carried out just as instructed, the control portion 108 sends a positive response to the control device 11 through the communication I/F portion 107. Further, when the switching is not carried out as instructed, the control portion 108 sends a negative response to the control device 11 through the communication I/F portion 107.

Further, on receiving the instruction to start charging the secondary battery, the control portion 108 turns on the switch 106 to start charging the secondary battery 103 by the power from the power supply unit 102. Then, when the charging is started just as instructed, the control portion 108 sends a positive response to the control device 11 through the communication I/F portion 107. Further, when the charging is not started, the control portion 108 sends a negative response to the control device 11 through the communication I/F portion 107. Further, on receiving the instruction to stop charging the secondary battery, the control portion 108 turns off the switch 106 to stop charging the secondary battery 103. Then, when the charging is stopped just as instructed, the control portion 108 sends a positive response to the control device 11 through the communication I/F portion 107. Further, when the charging is not stopped, the control portion 108 sends a negative response to the control device 11 through the communication I/F portion 107.

Further, the control portion 108 has a function to receive the remaining battery level of the secondary battery periodically notified of from the electrical device 10 through the communication cable 16, and update the electrical device state information 114D.

The electrical device 10 shown in FIG. 6 has the power supply unit 102 and secondary battery 103 for its own utilization. However, the present invention is not limited to such electrical device 10. For example, a plurality of electrical devices 10 may share the same power supply unit 102 and secondary battery 103.

Other Exemplary Embodiments

Hereinabove, the present invention was described through the two exemplary embodiments. However, the present invention is not limited to the above exemplary embodiments only, but is possible to undergo various other additional changes.

For example, the equipment power management system of the present invention may as well include electrical devices such as IT devices and the like without a secondary battery. Further, the control device 11 may as well be provide with a function to switch the electrical devices without a secondary battery from the operational state of operating on the power of the commercial power source to that of operating on a large-capacity secondary battery set up inside the equipment, and switch it conversely.

Further, the control device 11 may as well be provided with a function to control the facility power inside the equipment. For example, when the receiving power amount P indicated by the power meter 14 exceeds a preset power amount, the control device 11 may first turn off the lights inside the equipment. Further, when the receiving power amount P exceeds the preset power amount but the temperature inside the equipment obtained from a temperature sensor set up inside the equipment is below a preset first degree, the control device 11 may stop the operation of some cooling devices in operation, and restart the operation of the stopped cooling devices after the temperature exceeds a second degree.

Further, the equipment power management system of the present invention may as well have a self-contained power generator. In such a case, if the control in each of the aforementioned exemplary embodiments is carried out but the receiving power amount P of the equipment still exceeds the first threshold value P1, then the control device 11 may carry out another control to start up the self-contained power generator to provide a part or the whole of the equipment with the power generated by the self-contained power generator.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

[Supplementary Note 1]

An equipment power management system comprising:
a plurality of electrical devices operable in any one of multiple operational states different from each other in power consumption of a commercial power source; and
a control device for switching the operational state of an electrical device to that of a smaller power consumption of the commercial power source in ascending order from the electrical device of the lowest priority when a receiving power amount of the whole equipment including the plurality of electrical devices exceeds a first threshold value until the receiving power amount falls below a second threshold value which is lower than or equal to the first threshold value.

[Supplementary Note 2]

The equipment power management system according to Supplementary Note 1, wherein the control device repeats the process of selecting the electrical device of the lowest priority as the reduction object from the electrical devices operating in an operational state other than that of the least power consumption of the commercial power source, and switching the operational state of the selected electrical device to that of a smaller power consumption of the commercial power source until the receiving power amount falls below the second threshold value.

[Supplementary Note 3]

The equipment power management system according to Supplementary Note 2, wherein the control device preferentially selects an electrical device operating in the operational state of a larger power consumption of the commercial power source if every priority is identical in selecting the reduction object.

[Supplementary Note 4]

The equipment power management system according to Supplementary Note 2, wherein the control device classifies the electrical devices of an identical priority into an identical group, and selects an electrical device operating in the operational state of a larger power consumption of the commercial power source from the group of the electrical devices of the lowest priority among the electrical devices operating in an operational state other than that of the least power consumption of the commercial power source in selecting the reduction object.

[Supplementary Note 5]

The equipment power management system according to any one of Supplementary Notes 1 to 4, wherein the control device switches the operational state of an electrical device to that of a one-level smaller power consumption of the commercial power source in switching that to the operational state of a smaller power consumption of the commercial power source.

[Supplementary Note 6]

The equipment power management system according to any one of Supplementary Notes 1 to 5, wherein the control device selects the electrical device of the highest priority as the increase object from the electrical devices operating in an operational state other than that of the largest power consumption of the commercial power source when the receiving power amount falls below a third threshold value which is lower than or equal to the second threshold value, and switches the operational state of the selected electrical device to that of a larger power consumption of the commercial power source.

[Supplementary Note 7]

The equipment power management system according to Supplementary Note 6, wherein the control device preferentially selects an electrical device operating in the operational state of a smaller power consumption of the commercial power source if every priority is identical in selecting the increase object.

[Supplementary Note 8]

The equipment power management system according to Supplementary Note 6, wherein the control device classifies the electrical devices of an identical priority into an identical group, and selects an electrical device operating in the operational state of a smaller power consumption of the commercial power source from the group of the electrical devices of the highest priority among the electrical devices operating in an operational state other than that of the largest power consumption of the commercial power source in selecting the increase object.

[Supplementary Note 9]

The equipment power management system according to any one of Supplementary Notes 6 to 8, wherein the control device switches the operational state of an electrical device to that of a one-level larger power consumption of the commercial power source in switching that to the operational state of a larger power consumption of the commercial power source.

[Supplementary Note 10]

The equipment power management system according to any one of Supplementary Notes 1 to 5, wherein the control device selects the electrical device operating in the operational state of the least power consumption of the commercial power source as the increase object from the electrical devices of the highest priority among those operating in an operational state other than that of the largest power consumption of the commercial power source, calculates the difference between the power consumptions of the commercial power source for the selected electrical device before and after switching on the assumption of switching the operational state of the selected electrical device to that of a one-level larger power consumption of the commercial power source, takes the value of subtracting the calculated difference from the second threshold value as a third threshold value, and switches the operational state of the electrical device selected as the increase object to that of the one-level larger power consumption of the commercial power source when the receiving power amount falls below the third threshold value.

[Supplementary Note 11]

The equipment power management system according to any one of Supplementary Notes 1 to 10, wherein each electrical device is an IT device having a computer.

[Supplementary Note 12]

The equipment power management system according to Supplementary Note 11, wherein the priority of each electrical device is determined according to the service level of the application program executed by the computer.

[Supplementary Note 13]

The equipment power management system according to any one of Supplementary Notes 1 to 12, wherein the multiple operational states of the electrical devices include an operational state for operating the electrical devices in a low power consumption mode.

[Supplementary Note 14]

The equipment power management system according to any one of Supplementary Notes 1 to 13, wherein the multiple operational states of the electrical devices include an operational state for operating the electrical devices by a secondary battery, or an operational state for compensating part of the power for the electrical devices by a secondary battery.

[Supplementary Note 15]

The equipment power management system according to Supplementary Note 14, wherein the control device selects the electrical device with the secondary batter at the lowest remaining battery level and instructs the selected electrical device to start charging the secondary battery, when the receiving power amount falls below the second threshold value under the condition of the absence of electrical devices operating in an operational state other than that of the largest power consumption of the commercial power source.

[Supplementary Note 16]

The equipment power management system according to Supplementary Note 15, wherein the control device repeats selecting the electrical device with the secondary battery at the lowest remaining battery level and instructing the selected electrical device to start charging the secondary battery, with the receiving power amount in the range of not exceeding the second threshold value.

[Supplementary Note 17]

An equipment power management method to be carried out by a control device connected through a communication cable with a plurality of electrical devices operable in any one of multiple operational states different from each other in power consumption of a commercial power source, the method comprising:

switching the operational state of an electrical device to that of a smaller power consumption of the commercial power source in ascending order from the electrical device of the lowest priority when a receiving power amount of the whole equipment including the plurality of electrical devices exceeds a first threshold value until the receiving power amount falls below a second threshold value which is lower than or equal to the first threshold value.

[Supplementary Note 18]

The equipment power management method according to Supplementary Note 17, wherein the control device repeats the process of selecting the electrical device of the lowest priority as the reduction object from the electrical devices operating in an operational state other than that of the least power consumption of the commercial power source, and switching the operational state of the selected electrical device to that of a smaller power consumption of the commercial power source until the receiving power amount falls below the second threshold value.

[Supplementary Note 19]

The equipment power management method according to Supplementary Note 18, wherein the control device preferentially selects an electrical device operating in the operational state of a larger power consumption of the commercial power source if every priority is identical in selecting the reduction object.

[Supplementary Note 20]

The equipment power management method according to Supplementary Note 18, wherein the control device classifies the electrical devices of an identical priority into an identical group, and selects an electrical device operating in the operational state of a larger power consumption of the commercial power source from the group of the electrical devices of the lowest priority among the electrical devices operating in an operational state other than that of the least power consumption of the commercial power source in selecting the reduction object.

[Supplementary Note 21]

The equipment power management method according to any one of Supplementary Notes 17 to 20, wherein the control device switches the operational state of an electrical device to that of a one-level smaller power consumption of the commercial power source in switching that to the operational state of a smaller power consumption of the commercial power source.

[Supplementary Note 22]

The equipment power management method according to any one of Supplementary Notes 17 to 21, wherein the control device selects the electrical device of the highest priority as the increase object from the electrical devices operating in an operational state other than that of the largest power consumption of the commercial power source when the receiving power amount falls below a third threshold value which is lower than or equal to the second threshold value, and switches the operational state of the selected electrical device to that of a larger power consumption of the commercial power source.

[Supplementary Note 23]

The equipment power management method according to Supplementary Note 22, wherein the control device preferentially selects an electrical device operating in the operational state of a smaller power consumption of the commercial power source if every priority is identical in selecting the increase object.

[Supplementary Note 24]

The equipment power management method according to Supplementary Note 22, wherein the control device classifies the electrical devices of an identical priority into an identical group, and selects an electrical device operating in the operational state of a smaller power consumption of the commercial power source from the group of the electrical devices of the highest priority among the electrical devices operating in an operational state other than that of the largest power consumption of the commercial power source in selecting the increase object.

[Supplementary Note 25]

The equipment power management method according to any one of Supplementary Notes 22 to 24, wherein the control device switches the operational state of an electrical device to that of a one-level larger power consumption of the commercial power source in switching that to the operational state of a larger power consumption of the commercial power source.

[Supplementary Note 26]

The equipment power management method according to any one of Supplementary Notes 17 to 21, wherein the control device selects the electrical device operating in the operational state of the least power consumption of the commercial power source as the increase object from the electrical devices of the highest priority among those operating in an operational state other than that of the largest power consumption of the commercial power source, calculates the difference between the power consumptions of the commercial power source for the selected electrical device before and after switching on the assumption of switching the operational state of the selected electrical device to that of a one-level larger power consumption of the commercial power source, takes the value of subtracting the calculated difference from the second threshold value as a third threshold value, and switches the operational state of the electrical device selected as the increase object to that of the one-level larger power consumption of the commercial power source when the receiving power amount falls below the third threshold value.

[Supplementary Note 27]

The equipment power management method according to any one of Supplementary Notes 17 to 26, wherein each electrical device is an IT device having a computer.

[Supplementary Note 28]

The equipment power management method according to Supplementary Note 27, wherein the priority of each electrical device is determined according to the service level of the application program executed by the computer.

[Supplementary Note 29]

The equipment power management method according to any one of Supplementary Notes 17 to 28, wherein the multiple operational states of the electrical devices include an operational state for operating the electrical devices in a low power consumption mode.

[Supplementary Note 30]

The equipment power management method according to any one of Supplementary Notes 17 to 29, wherein the multiple operational states of the electrical devices include an operational state for operating the electrical devices by a secondary battery, or an operational state for compensating part of the power for the electrical devices by a secondary battery.

[Supplementary Note 31]

The equipment power management method according to Supplementary Note 30, wherein the control device selects the electrical device with the secondary batter at the lowest remaining battery level and instructs the selected electrical device to start charging the secondary battery, when the receiving power amount falls below the second threshold value under the condition of the absence of electrical devices operating in an operational state other than that of the largest power consumption of the commercial power source.

[Supplementary Note 32]

The equipment power management method according to Supplementary Note 31, wherein the control device repeats selecting the electrical device with the secondary battery at the lowest remaining battery level and instructing the selected electrical device to start charging the secondary battery, with the receiving power amount in the range of not exceeding the second threshold value.

[Supplementary Note 33]

A control device comprising:

a communication interface unit for carrying out communications with a plurality of electrical devices operable in any one of multiple operational states different from each other in power consumption of a commercial power source; and a power reduction control unit for switching the operational state of an electrical device to that of a smaller power consumption of the commercial power source in ascending order from the electrical device of the lowest priority when a receiving power amount of the whole equipment including the plurality of electrical devices exceeds a first threshold value until the receiving power amount falls below a second threshold value which is lower than or equal to the first threshold value.

[Supplementary Note 34]

The control device according to Supplementary Note 33, wherein the power reduction control unit repeats the process of selecting the electrical device of the lowest priority as the reduction object from the electrical devices operating in an operational state other than that of the least power consumption of the commercial power source, and switching the operational state of the selected electrical device to that of a smaller power consumption of the commercial power source until the receiving power amount falls below the second threshold value.

[Supplementary Note 35]

The control device according to Supplementary Note 34, wherein the power reduction control unit preferentially selects an electrical device operating in the operational state of a larger power consumption of the commercial power source if every priority is identical in selecting the reduction object.

[Supplementary Note 36]

The control device according to Supplementary Note 34, wherein the power reduction control unit classifies the electrical devices of an identical priority into an identical group, and selects an electrical device operating in the operational state of a larger power consumption of the commercial power source from the group of the electrical devices of the lowest priority among the electrical devices operating in an operational state other than that of the least power consumption of the commercial power source in selecting the reduction object.

[Supplementary Note 37]

The control device according to any one of Supplementary Notes 33 to 36, wherein the power reduction control unit switches the operational state of an electrical device to that of a one-level smaller power consumption of the commercial power source in switching that to the operational state of a smaller power consumption of the commercial power source.

[Supplementary Note 38]

The control device according to any one of Supplementary Notes 33 to 37 further comprising a power increase control unit for selecting the electrical device of the highest priority as the increase object from the electrical devices operating in an operational state other than that of the largest power consumption of the commercial power source when the receiving power amount falls below a third threshold value which is lower than or equal to the second threshold value, and switching the operational state of the selected electrical device to that of a larger power consumption of the commercial power source.

[Supplementary Note 39]

The control device according to Supplementary Note 38, wherein the power increase control unit preferentially selects an electrical device operating in the operational state of a smaller power consumption of the commercial power source if every priority is identical in selecting the increase object.

[Supplementary Note 40]

The control device according to Supplementary Note 38, wherein the power increase control unit classifies the electrical devices of an identical priority into an identical group, and selects an electrical device operating in the operational state of a smaller power consumption of the commercial power source from the group of the electrical devices of the highest priority among the electrical devices operating in an operational state other than that of the largest power consumption of the commercial power source in selecting the increase object.

[Supplementary Note 41]

The control device according to any one of Supplementary Notes 38 to 40, wherein the power increase control unit switches the operational state of an electrical device to that of a one-level larger power consumption of the commercial power source in switching that to the operational state of a larger power consumption of the commercial power source.

[Supplementary Note 42]

The control device according to any one of Supplementary Notes 33 to 37, wherein the power increase control unit selects the electrical device operating in the operational state of the least power consumption of the commercial power source as the increase object from the electrical devices of the highest priority among those operating in an operational state other than that of the largest power consumption of the commercial power source, calculates the difference between the power consumptions of the commercial power source for the selected electrical device before and after switching on the assumption of switching the operational state of the selected electrical device to that of a one-level larger power consumption of the commercial power source, takes the value of subtracting the calculated difference from the second threshold value as a third threshold value, and switches the operational state of the electrical device selected as the increase object to that of the one-level larger power consumption of the commercial power source when the receiving power amount falls below the third threshold value.

[Supplementary Note 43]

The control device according to any one of Supplementary Notes 33 to 42, wherein each electrical device is an IT device having a computer.

[Supplementary Note 44]

The control device according to Supplementary Note 43, wherein the priority of each electrical device is determined according to the service level of the application program executed by the computer.

[Supplementary Note 45]

The control device according to any one of Supplementary Notes 33 to 42, wherein the multiple operational states of the electrical devices include an operational state for operating the electrical devices in a low power consumption mode.

[Supplementary Note 46]

The control device according to any one of Supplementary Notes 33 to 45, wherein the multiple operational states of the electrical devices include an operational state for operating the electrical devices by a secondary battery, or an operational state for compensating part of the power for the electrical devices by a secondary battery.

[Supplementary Note 47]

The control device according to Supplementary Note 46 further comprising a charging control unit for selecting the electrical device with the secondary batter at the lowest remaining battery level and instructing the selected electrical device to start charging the secondary battery, when the receiving power amount falls below the second threshold value under the condition of the absence of electrical devices operating in an operational state other than that of the largest power consumption of the commercial power source.

[Supplementary Note 48]

The control device according to Supplementary Note 47, wherein the charging control unit repeats selecting the electrical device with the secondary battery at the lowest remaining battery level and instructing the selected electrical device to start charging the secondary battery, with the receiving power amount in the range of not exceeding the second threshold value.

[Supplementary Note 49]

A computer-readable medium storing a program comprising instructions for causing a computer to function as:

a communication interface unit for carrying out communications with a plurality of electrical devices operable in any one of multiple operational states different from each other in power consumption of a commercial power source; and a power reduction control unit for switching the operational state of an electrical device to that of a smaller power consumption of the commercial power source in ascending order from the electrical device of the lowest priority when a receiving power amount of the whole equipment including the plurality of electrical devices exceeds a first threshold value until the receiving power amount falls below a second threshold value which is lower than or equal to the first threshold value.

[Supplementary Note 50]

The computer-readable medium storing the program according to Supplementary Note 49, wherein the power reduction control unit repeats the process of selecting the electrical device of the lowest priority as the reduction object from the electrical devices operating in an operational state other than that of the least power consumption of the commercial power source, and switching the operational state of the selected electrical device to that of a smaller power consumption of the commercial power source until the receiving power amount falls below the second threshold value.

[Supplementary Note 51]

The computer-readable medium storing the program according to Supplementary Note 50, wherein the power reduction control unit preferentially selects an electrical device operating in the operational state of a larger power consumption of the commercial power source if every priority is identical in selecting the reduction object.

[Supplementary Note 52]

The computer-readable medium storing the program according to Supplementary Note 50, wherein the power reduction control unit classifies the electrical devices of an identical priority into an identical group, and selects an electrical device operating in the operational state of a larger power consumption of the commercial power source from the group of the electrical devices of the lowest priority among the electrical devices operating in an operational state other than that of the least power consumption of the commercial power source in selecting the reduction object.

[Supplementary Note 53]

The computer-readable medium storing the program according to any one of Supplementary Notes 49 to 52, wherein the power reduction control unit switches the operational state of an electrical device to that of a one-level smaller power consumption of the commercial power source in switching that to the operational state of a smaller power consumption of the commercial power source.

[Supplementary Note 54]

The computer-readable medium storing the program according to any one of Supplementary Notes 49 to 53 further causing a computer to function as a power increase control unit for selecting the electrical device of the highest priority as the increase object from the electrical devices operating in an operational state other than that of the largest power consumption of the commercial power source when the receiving power amount falls below a third threshold value which is lower than or equal to the second threshold value, and switching the operational state of the selected electrical device to that of a larger power consumption of the commercial power source.

[Supplementary Note 55]

The computer-readable medium storing the program according to Supplementary Note 54, wherein the power increase control unit preferentially selects an electrical device operating in the operational state of a smaller power consumption of the commercial power source if every priority is identical in selecting the increase object.

[Supplementary Note 56]

The computer-readable medium storing the program according to Supplementary Note 54, wherein the power increase control unit classifies the electrical devices of an identical priority into an identical group, and selects an electrical device operating in the operational state of a smaller power consumption of the commercial power source from the group of the electrical devices of the highest priority among the electrical devices operating in an operational state other than that of the largest power consumption of the commercial power source in selecting the increase object.

[Supplementary Note 57]

The computer-readable medium storing the program according to any one of Supplementary Notes 54 to 56, wherein the power increase control unit switches the operational state of an electrical device to that of a one-level larger power consumption of the commercial power source in switching that to the operational state of a larger power consumption of the commercial power source.

[Supplementary Note 58]

The computer-readable medium storing the program according to any one of Supplementary Notes 49 to 53, wherein the power increase control unit selects the electrical device operating in the operational state of the least power consumption of the commercial power source as the increase object from the electrical devices of the highest priority among those operating in an operational state other than that of the largest power consumption of the commercial power source, calculates the difference between the power consumptions of the commercial power source for the selected electrical device before and after switching on the assumption of switching the operational state of the selected electrical device to that of a one-level larger power consumption of the commercial power source, takes the value of subtracting the calculated difference from the second threshold value as a third threshold value, and switches the operational state of the electrical device selected as the increase object to that of the one-level larger power consumption of the commercial power source when the receiving power amount falls below the third threshold value.

[Supplementary Note 59]

The computer-readable medium storing the program according to any one of Supplementary Notes 49 to 58, wherein each electrical device is an IT device having a computer.

[Supplementary Note 60]

The computer-readable medium storing the program according to Supplementary Note 59, wherein the priority of each electrical device is determined according to the service level of the application program executed by the computer.

[Supplementary Note 61]

The computer-readable medium storing the program according to any one of Supplementary Notes 49 to 60, wherein the multiple operational states of the electrical devices include an operational state for operating the electrical devices in a low power consumption mode.

[Supplementary Note 62]

The computer-readable medium storing the program according to any one of Supplementary Notes 49 to 61, wherein the multiple operational states of the electrical devices include an operational state for operating the electrical devices by a secondary battery, or an operational state for compensating part of the power for the electrical devices by a secondary battery.

[Supplementary Note 63]

The computer-readable medium storing the program according to Supplementary Note 62 further causing a computer to function as a charging control unit for selecting the electrical device with the secondary batter at the lowest remaining battery level and instructing the selected electrical device to start charging the secondary battery, when the receiving power amount falls below the second threshold value under the condition of the absence of electrical devices operating in an operational state other than that of the largest power consumption of the commercial power source.

[Supplementary Note 64]

The computer-readable medium storing the program according to Supplementary Note 63, wherein the charging control unit repeats selecting the electrical device with the secondary battery at the lowest remaining battery level and instructing the selected electrical device to start charging the secondary battery, with the receiving power amount in the range of not exceeding the second threshold value.

The invention claimed is:

1. An equipment power management method to be carried out by a control device connected through a communication cable with a plurality of electrical devices operable in any one of multiple operational states different from each other in power consumption, each of the electrical devices consuming power supplied by a commercial power source, the method comprising:

switching the operational state of an electrical device to that of a smaller power consumption in ascending order from the electrical device of lower priority when a receiving amount of power of the plurality of electrical devices exceeds a first threshold value until the receiving amount of power falls below a second threshold value which is lower than or equal to the first threshold value;

wherein the control device repeats the process of selecting the electrical device of the lowest priority as the reduction object from the electrical devices operating in an operational state other than that of the least power consumption, and switching the operational state of the selected electrical device to that of a smaller power consumption, a plurality of times until the receiving amount of power falls below the second threshold value, and wherein when each electrical device has the lowest priority, the control device preferentially selects an electrical device operating in the operational state of a power consumption greater than the least power consumption.

2. The equipment power management method of claim 1, wherein the electrical device operating in the operational state of the power consumption greater than the least power consumption is an electrical device operating in an operational state of a largest power consumption.

\* \* \* \* \*